(12) United States Patent
Sohn et al.

(10) Patent No.: US 8,124,703 B2
(45) Date of Patent: Feb. 28, 2012

(54) MALEIMIDE-ALPHA-ALKYLSTYRENE-BASED TETRAPOLYMER WITH LOW MOLTEN VISCOSITY AND CONTINUOUS BULK PROCESS FOR PRODUCING IT

(75) Inventors: Dong Cheol Sohn, Ulsan (KR); Sup Joo Lee, Ulsan (KR); Byung Yoon Ahn, Gyeongsangnam-do (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 0 days.

(21) Appl. No.: 12/443,358

(22) PCT Filed: Dec. 2, 2006

(86) PCT No.: PCT/KR2006/005161
§ 371 (c)(1),
(2), (4) Date: Jun. 26, 2009

(87) PCT Pub. No.: WO2008/038857
PCT Pub. Date: Apr. 3, 2008

(65) Prior Publication Data
US 2010/0036065 A1     Feb. 11, 2010

(30) Foreign Application Priority Data
Sep. 28, 2006 (KR) .................. 10-2006-0094738

(51) Int. Cl.
C08F 222/40 (2006.01)
(52) U.S. Cl. ...................... 526/262; 526/347; 526/347.1

(58) Field of Classification Search .................. 526/262, 526/347, 347.1
See application file for complete search history.

(56) References Cited

U.S. PATENT DOCUMENTS
4,757,109 A * 7/1988 Kishida et al. ............... 524/808

FOREIGN PATENT DOCUMENTS
EP    1090937    11/2001
JP    60-31552    2/1985

* cited by examiner

*Primary Examiner* — Robert D. Harlan
(74) *Attorney, Agent, or Firm* — Steptoe & Johnson LLP

(57) ABSTRACT

Disclosed are a maleimide-α-alkylstyrene-based, heat-resistant bulk tetrapolymer and a preparation process thereof. More specifically, disclosed are a bulk tetrapolymer, comprising 5-60 wt % of an N-substituted maleimide monomer, 10-70 wt % of an α-alkylstyrene monomer, 5-50 wt % of an unsaturated nitrile monomer and 3-50 wt % of an aromatic vinyl monomer, as well as a continuous bulk polymerization process for preparing the same. The disclosed bulk tetrapolymer has a weight-average molecular weight (Mw) of 70,000-300,000 and a glass transition temperature of 150-200° C., shows excellent high-temperature thermal stability and heat resistance and a remarkably low melt viscosity, and thus is excellent not only in processability, but also in productivity, processability, moldability and blendability, when it is blended with other resins. Also, the continuous bulk polymerization process is equipped with a devolatilizer and enables the bulk tetrapolymer to be produced at low cost and high efficiency.

9 Claims, 2 Drawing Sheets

[Fig. 1]
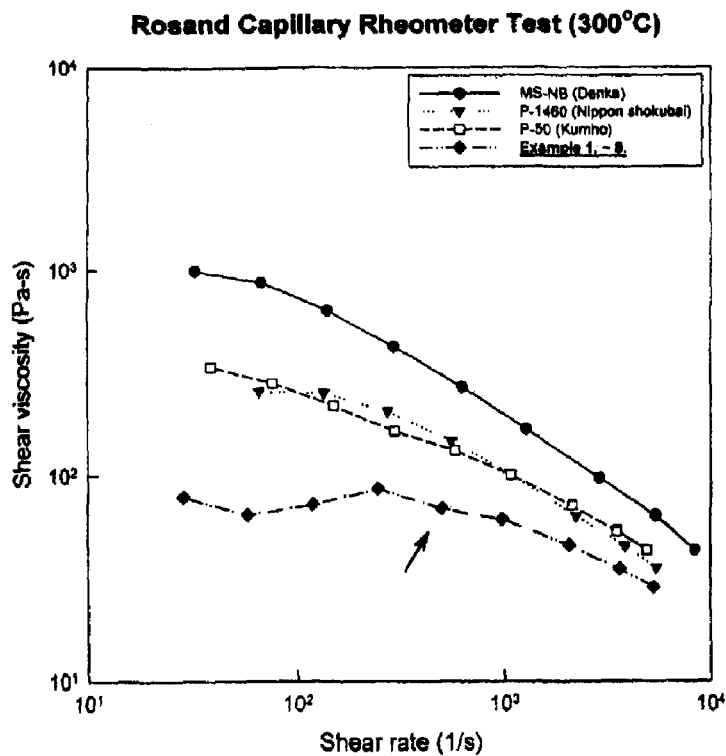
[Fig. 2]
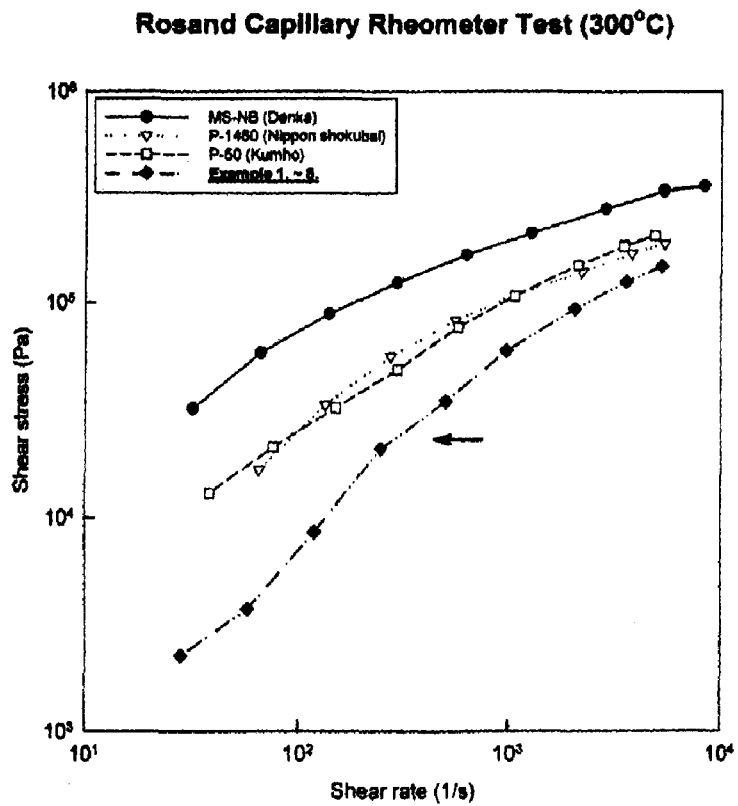

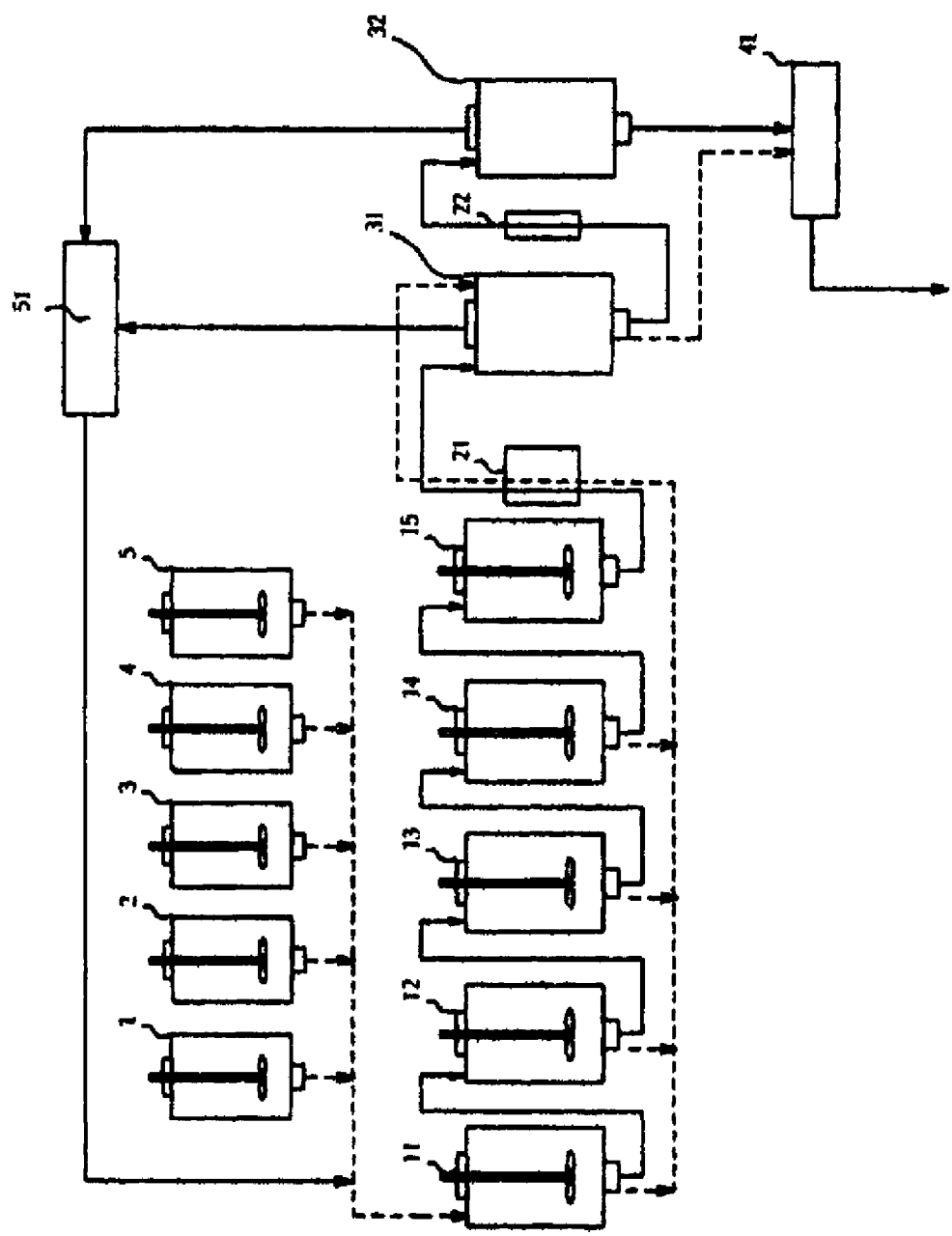
[Fig. 3]

… (1)

MALEIMIDE-ALPHA-ALKYLSTYRENE-BASED TETRAPOLYMER WITH LOW MOLTEN VISCOSITY AND CONTINUOUS BULK PROCESS FOR PRODUCING IT

CLAIM OF PRIORITY

This application claims priority under 35 USC 371 to International Application No. PCT/KR2006/005161, filed on Dec. 2, 2006, which claims priority to Korean Application No. 10-2006-0094738 filed Sep. 28, 2006, each of which is incorporated by reference in its entirety.

TECHNICAL FIELD

The present invention relates to a maleimide-α-alkylstyrene-based bulk tetrapolymer and a process for preparing the same, and more particularly to a heat-resistant tetrapolymer, comprising 5-60 wt % of an N-substituted maleimide monomer, 10-70 wt % of an α-alkylstyrene monomer, 5-50 wt % of an unsaturated nitrile monomer and 3-50 wt % of an aromatic vinyl monomer, and to a continuous bulk polymerization process for preparing the same.

BACKGROUND ART

Prior heat-resistant copolymers can be classified, according to the component and the polymerization process, into different types. Specifically, the heat-resistant copolymers are broadly classified, according to the component, into maleimide-based copolymers and α-alkylstyrene-based copolymers, and are classified, according to the polymerization process, into emulsion copolymers, suspension copolymers, solution copolymers and bulk copolymers.

The maleimide-based copolymers are generally prepared using a solution polymerization process due to technical problems associated with polymerization. Generally, the maleimide-based copolymers contain a large amount of maleimide, and thus they show high heat distortion temperature and high thermal decomposition temperature properties, and have an advantage of greatly improving the heat resistance of various thermoplastic resins, when they are blended with the thermoplastic resins. Meanwhile, when the maleimide-based copolymers have a high maleimide content, they will have a considerably high melt viscosity, leading to a high processing temperature, and stay at high temperatures, which deteriorate the color tone. Also, because heat resistance and impact resistance are generally inversely proportional to each other, the maleimide-based, heat-resistant copolymers have a problem in that an increase in the amount thereof blended with various thermoplastic resins leads to a rapid decrease in the impact resistance of the thermoplastic resins. In addition, they have a disadvantage in that, because they contain a large amount of expensive maleimide, the resulting heat-resistant copolymers have low price competitiveness.

Meanwhile, the α-alkylstyrene-based copolymers are mainly prepared using a bulk polymerization process or an emulsion polymerization process. The α-alkylstyrene-based copolymers prepared by bulk polymerization generally have a low α-alkylstyrene content, leading to a low melt viscosity. For this reason, they have advantages in that they have excellent processability, and when they are blended with various thermoplastic resins, the thermoplastic resins have a good color and excellent impact resistance and are relatively inexpensive. However, the α-alkylstyrene-based copolymers prepared by bulk polymerization have a disadvantage in that it is difficult to exhibit high heat resistance, which is most important. On the other hand, the emulsion-polymerized α-alkylstyrene-based copolymers have an advantage in that they can exhibit a heat resistance of about 135° C. due to a high α-alkylstyrene content. However, these emulsion-polymerized copolymers have disadvantages in that they have a significantly low processability due to a high melt viscosity versus heat resistance, and because low-molecular-weight emulsifying agents and other additives mostly remain in the resulting products due to the characteristics of the emulsion polymerization process, the emulsion-polymerized copolymers reduce the color of various thermoplastic resins, when they are added to the thermoplastic resins. In addition, they can generate gas during their processing, thus making the appearance poor.

More specifically, polymerization processes for preparing the maleimide-based copolymers are broadly classified into three categories: an emulsion polymerization process, a suspension polymerization process and a solution polymerization process. First, the emulsion polymerization process has been mainly applied for the preparation of polymerization products having a low maleimide content, because, when polymerization products have a high maleimide content, they have a high softening point during a polymer recovery process after completion of the polymerization, and thus they are impossible to recover from the emulsion system. This emulsion polymerization process has disadvantages in that the impact resistance of the emulsion polymers is reduced due to the influence of the remaining emulsifying agents, the color tone of the polymers is severely changed during a molding process, and a coagulation system is additionally required. Second, in the case of the suspension polymerization process, a maleimide monomer and an unsaturated vinyl monomer tend to form alternating copolymers. Thus, there is a disadvantage in that, if copolymers having a high maleimide content are to be obtained, a filtering system is additionally required, because non-uniform copolymers having different compositions are likely to be formed. Third, the solution polymerization process has a disadvantage in that it entails a very high production cost, because it requires a process of removing a solvent used in the polymerization and a process of extracting a polymerization product from a solution system using a solvent/non-solvent system. Also, the above-mentioned polymerization processes (the emulsion polymerization process, the suspension polymerization process and the solution polymerization process) can all be carried out in a batch process, which has low productivity.

A maleimide-aromatic vinyl copolymer prepared by solution polymerization, disclosed in Japanese Patent Publication No. 1982-98536, has excessively high thermal heat resistance and melt viscosity, leading to high processing temperature, is poorly colored due to its poor color tone, and shows poor blendability with ABS (acrylonitrile-butadiene-styrene copolymer; hereinafter, referred to as "ABS resin") and AS (acrylonitrile-styrene copolymer; hereinafter, referred to as AS resin) due to a great difference in melt viscosity from the resins. Moreover, an N-substituted maleimide-aromatic vinyl copolymer prepared by solution polymerization, disclosed in Japanese Patent Publication No. 1983-162616, has disadvantages in that a system for recovering a solvent used in polymerization, and a separate solvent tank, are required, and the polymerization product is not practical due to its high production cost. Furthermore, an N-substituted maleimide-aromatic vinyl copolymer prepared by solution polymerization, disclosed in Japanese Patent Publication No. 2003-41080, is insufficient in terms of production cost, because the resulting polymerization product synthesized by solution polymerization is precipitated in methanol, and thus a large amount of methanol solvent is required. Also, an α-alkylstyrene-N-substituted maleimide-unsaturated nitrile-aromatic vinyl copolymer has disadvantages in that, because it is prepared by suspension polymerization, non-uniform copolymers having different compositions are likely to be formed, a filtering system is additionally required, and large amounts of additives, such as suspending agents, which remain in the polymerization product, adversely affect the physical properties of the polymerization product. Moreover, N-substituted maleimide-unsaturated nitrile-maleic anhydride copolymers, disclosed in Japanese Patent Publication Nos. 1987-280249 and 1990-189361, are prepared by solution polymerization and have problems in that they are not practical due to their high production cost, have a high melt viscosity, and show poor blendability with ABS resin, because they contain maleic anhydride. Furthermore, α-alkylstyrene-unsaturated nitrile copolymers prepared by bulk polymerization, disclosed in U.S. Pat. Nos. 4,874,829 and 6,593,424, have good pro-cessability, but have remarkably low heat resistance, because they contains α-alkylstyrene as a main component. In addition, N-substituted maleimide-unsaturated nitrile-aromatic vinyl copolymers prepared by solution polymerization, disclosed in U.S. Pat. Nos. 5,478,903 and 5,565,537, and N-substituted maleimide-aromatic vinyl copolymers prepared by solution polymerization, disclosed in Japanese Patent Publication Nos. 2004-307760 and 2005-54097, have problems in that they have a considerably high production cost due to the use of the solution polymerization process, show excessively high heat resistance and melt viscosity, leading to high processing temperature, and have low pro-cessability. Also, when these copolymers are blended with other resins, they show low impact resistance, due to a decrease in blendability with the resins, which results from a difference in melt viscosity from the resins.

DISCLOSURE OF INVENTION

Technical Problem

Accordingly, the present inventors have conducted studies to simultaneously solve the problems of the prior maleimide-based copolymers, including a decrease in pro-cessability caused by high heat resistance and high melt viscosity, resulting from high maleimide content, a decrease in impact resistance, caused by a decrease in blendability with other resins, and a high production cost resulting from the application of the solution polymerization or suspension polymerization process, and in addition, the problems of the prior α-alkylstyrene-based copolymer, including low heat resistance, a decrease in processability, and reductions in the appearance quality and color tone of molded articles, which occur when they are mixed with other resins. As a result, the present inventors have developed a heat-resistant tetrapolymer, which has excellent high-temperature thermal stability and heat resistance and a remarkably low melt viscosity, and thus is excellent not only in processability, but also in productivity, processability, moldability and blendability when it is blended with other thermoplastic resins, so that it can show high heat resistance, and which can be prepared at low cost and high efficiency, as well as a preparation process thereof. Specifically, the tetrapolymer and the preparation process thereof have been developed by: applying maleimide, having high heat resistance and thermal stability and the effect of increasing melt viscosity, together with α-alkylstyrene, having low heat resistance and thermal stability compared to those of maleimide, but having excellent impact resistance, in which the expensive maleimide is used in a reduced amount in order to achieve low production cost and low melt viscosity and, at the same time, make it possible to apply a continuous bulk polymerization process, which is advantageous for high productivity and the low-cost preparation of polymerization products, a decrease in heat resistance, resulting from a decrease in maleimide content, is complemented by introducing a suitable amount of α-alkylstyrene; applying unsaturated nitrile, having excellent chemical resistance and serving as a solvent for solid maleimide, so as to make the polymerization system uniform, thus making it possible to apply the continuous bulk polymerization process; an aromatic vinyl monomer having excellent processability and colorability, to remarkably reduce the melt viscosity of the polymerization product and maximize blendability with other thermoplastic resins; and applying a continuous bulk polymerization process equipped with a devolatilizer. On the basis of this development, the present invention has been completed.

Therefore, it is an object of the present invention to provide a low-melt-viscosity, maleimide-α-alkylstyrene-based, heat-resistant tetrapolymer, which is excellent in high-temperature thermal stability and heat resistance, processability and blendability, as well as a continuous bulk polymerization process for the preparation thereof, which is equipped with a devolatilizer.

Technical Solution

To achieve the above object, the present invention provides a bulk tetrapolymer of an N-substituted maleimide monomer, an α-alkylstyrene monomer, an unsaturated nitrile monomer and an aromatic vinyl monomer.

In the present invention, the N-substituted maleimide monomer is selected from the group consisting of N-phenylmaleimide, maleimide, N-methylmaleimide, N-ethylmaleimide, N-propylmaleimide, N-isopropylmaleimide, N-butylmaleimide, N-isobutylmaleimide, N-t-butylmaleimide, N-cyclohexylmaleimide, N-chlorophenylmaleimide, N-methylphenylmaleimide, N-bromophenylmaleimide, N-naphthylmaleimide, N-laurylmaleimide, N-hydroxyphenylmaleimide, N-methoxyphenylmaleimide, N-carboxyphenylmaleimide, N-nitrophenylmaleimide, N-benzylmaleimide, and mixtures of these monomers with a small amount of monomers copolymerizable therewith.

In the present invention, the N-substituted maleimide monomer is preferably used in an amount of 5-60 wt % based on the total amount of the tetrapolymer, such that it is possible to prevent a reduction in the heat resistance and thermal stability of the tetrapolymer and, at the same time, inhibit an increase in the melt viscosity and brittleness of the tetrapolymer, and thus when the tetrapolymer is blended with other resins, it is easy to maintain processability and blendability and to control heat generation.

In the present invention, the α-alkylstyrene monomer is selected from the group consisting of α-methylstyrene, α-ethylstyrene, methyl-α-methyl, and mixtures of these monomers with a small amount of monomers copolymerizable therewith.

In the present invention, the α-alkylstyrene monomer is preferably used in an amount of 10-70 wt % based on the total amount of the tetrapolymer, such that it is possible to prevent a reduction in heat resistance, which can occur when the content thereof in the tetrapolymer is low, and it is possible to prevent a change in polymerization rate and a reduction in thermal stability and color tone, which can occur when the content thereof in the tetrapolymer is high.

In the present invention, the unsaturated nitrile monomer that is used to prepare the tetrapolymer is selected from the group consisting of acrylonitrile, methacrylonitrile, ethacrylonitrile, phenylacrylonitrile, α-chloroacrylonitrile and the like.

In the present invention, the unsaturated nitrile monomer is preferably in an amount of more than 5 wt % based on the total weight of the tetrapolymer, such that it is possible to maintain a suitable polymerization rate and prevent non-uniform polymerization from occurring due to a decrease in the solubility of the N-substituted maleimide monomer. Also, it is preferably used in an amount of less than 50 wt % based on the total weight of the tetrapolymer, such that it is easy to control heat generation during polymerization and it is possible to maintain the color tone of the tetrapolymer.

In the present invention, the aromatic vinyl monomer is selected from the group consisting of styrenic monomers, including styrene, α-methylstyrene vinyltoluene, t-butylstyrene, halogen-substituted styrene, 1,3-dimethylstyrene, 2,4-dimethylstyrene, ethylstyrene, and mixtures thereof.

In the present invention, the aromatic vinyl monomer is preferably used in an amount of more than 3 wt % based on the total weight of the tetrapolymer, such that the melt viscosity of the tetrapolymer can be maintained at a low level, and thus when the resulting polymerization product is blended with other resins, it can have good pro-cessability, moldability and blendability, and it is possible to prevent a decrease in the thermal stability thereof. Also, the aromatic vinyl monomer is used in an amount of less than 50 wt % based on the total weight of the tetrapolymer, such that it is possible to prevent a decrease in the heat resistance of the tetrapolymer.

In one aspect, the present invention provides a bulk tetrapolymer, which comprises 5-60 wt % of an N-substituted maleimide monomer, 10-70 wt % of an α-alkylstyrene monomer, 5-50 wt % of an unsaturated nitrile monomer and 3-50 wt % of an aromatic vinyl polymer, and has a weight-average molecular weight (Mw) of 70,000-300,000 and a glass transition temperature of 150-200° C., such that it has low melt viscosity.

Without being limited to any particular theory, in the above-described construction, low production cost and the application of the continuous bulk polymerization process, which is advantageous for high productivity and the low-cost preparation of polymerization products, can be achieved by applying maleimide, having high heat resistance and thermal stability and the effect of increasing melt viscosity, together with α-alkylstyrene, having low heat resistance and thermal stability compared to those of maleimide, but having excellent impact resistance, in which the expensive maleimide is used in a reduced amount, and a decrease in heat resistance, resulting from a decrease in maleimide content, can be complemented by introducing a suitable amount of α-alkylstyrene; the application of unsaturated nitrile, having excellent chemical resistance and serving as a solvent for solid maleimide, makes the polymerization system uniform, thus making it possible to apply the continuous bulk polymerization process; and the application of the aromatic vinyl monomer, having excellent processability and colorability, remarkably reduces the melt viscosity of the polymerization product and maximizes blendability with other resins.

In the practice of the present invention, the bulk tetrapolymer preferably has a melt viscosity of about 10-200 Pa.s, such that the heat resistance of the tetrapolymer can be maintained, while the blendability with other resins can be maximized.

In another aspect, the present invention provides a process for preparing a bulk tetrapolymer, comprising the steps of: continuously introducing a mixture of an N-substituted maleimide monomer, an α-alkylstyrene monomer, an unsaturated nitrile monomer and an aromatic vinyl monomer into a polymerization reactor comprising one or more stirred tank reactors; continuously polymerizing the monomer mixture introduced into the polymerization reactor; and transferring the resulting mixture of polymer and unreacted monomers into a devolatilizer, in which the mixture is separated into the polymer and the unreacted monomers.

In the present invention, the N-substituted maleimide monomer, the α-alkylstyrene monomer, the unsaturated nitrile monomer and the aromatic vinyl monomer can be continuously introduced from the respective storage tanks through a metering pump, or can be mixed with each other in a separate preparation tank, and then introduced into the polymerization reactor. In a preferred embodiment of the present invention, the monomers are mixed with each other in a plurality of preparation tanks, and then alternately introduced until completion of the polymerization reaction.

In the present invention, the polymerization reactor, in which the introduced monomers are polymerized, may comprise one or more stirred tank reactors, which are connected with each other. The polymer and unreacted monomer mixture, which are discharged from each of the stirred tank reactors, are introduced into the next stirred tank reactor in order to further increase the polymerization conversion, or are introduced into the devolatilizer in order to separate the unreacted monomers from the reaction mixture.

In an embodiment of the present invention, the mixture of polymer and unreacted monomers, formed in a first stirred tank reactor, is transferred through the lower portion of the first stirred tank reactor into the upper portion of a second stirred tank reactor, in which it is polymerized. Then, it is transferred through the lower portion of the second stirred tank reactor into the upper portion of a third stirred tank reactor, and reaches a fifth stirred tank reactor through the same procedure as described above.

In a preferred embodiment of the present invention, lines for feeding additives or monomers can be additionally connected to each of the stirred tank reactors in order to adjust viscosity or the composition of the final product.

The mixture of polymer and monomers, passed through each of the stirred tank reactors, is transferred into the next stirred tank reactor, or is transferred from each of the stirred tank reactors directly into the devolatilizer, in which it is separated into the unreacted monomers and the polymer.

The recovered unreacted monomer mixtures are introduced into the upper portion of the first stirred tank reactor through a condenser, and the molten polymer, passed through the devolatilizer, is passed through an extruder equipped with a vacuum system, and is finally prepared into a maleimide-α-alkylstyrene-based, heat-resistant tetrapolymer, which comprises the N-substituted maleimide monomer, the α-alkylstyrene monomer, the unsaturated nitrile monomer and the aromatic vinyl polymer.

In one embodiment of the present invention, for the preparation of the monomer mixture, the α-alkylstyrene monomer, the unsaturated nitrile monomer and the aromatic vinyl monomer are introduced first such that the solid N-substituted maleimide monomer can be dissolved, and then the N-substituted maleimide monomer is introduced into the preparation tank, in which the monomers are mixed with each other. Alternatively, the α-alkylstyrene monomer and the aromatic vinyl monomer may also be introduced first into the preparation tank, and then a solution of the N-substituted maleimide monomer in the unsaturated nitrile monomer can be introduced into the preparation tank. Alternatively, the monomers may also be introduced directly into the polymerization reactor in the same manner as described above.

In the present invention, the polymerization reactors can be operated under pressure or under reduced pressure, and the temperature of the polymer/monomer mixture in each of the polymerization reactors is preferably maintained at 60-180° C. during the polymerization, such that the polymerization rate can be sufficiently maintained.

In the present invention, the polymer/monomer mixture in each of the polymerization reactors is preferably polymerized while it is maintained at a level of 40-95% of the stirred tank reactor. If the level is low, a problem of a reduction in productivity, caused by a decrease in polymerization rate, can occur, and if the level is high, there will be a problem in that it is difficult to control heat.

In the present invention, the devolatilizer is provided such that it separates the reaction product polymer from the unreacted monomers. The devolatilizer may consist of one or more devolatilizer units. In an embodiment of the present invention, the de-volatilizer may consist of two or more devolatilizer units, and each of the devolatilizer units can be connected to the next devolatilizer unit or an extruder. For example, the transferred mixture of polymer and monomers can be passed through a devolatilizer unit, and then transferred into a second devolatilizer unit or transferred directly into an extruder, and the molten polymer, passed through the second devolatilizer, can be transferred into a third devolatilizer or transferred directly into the extruder. The last devolatilizer unit may be connected directly to the extruder. In an embodiment of the present invention, the devolatilizers can be operated under reduced pressure in order to make it easy to separate the unreacted monomers from the polymer, and preferably, it can be operated at an internal pressure of 0 to −760 mmHg.

In the present invention, the unreacted monomer mixtures, recovered from the devolatilizers, are condensed into the original form in the condenser, the contents thereof are analyzed using a component analysis system, preferably GC (gas chromatography, CP-3800/VARIAN) equipment, and the analyzed monomer mixtures are introduced again into the upper portion of the first polymerization reactor. A series of such processes are repeated until the production of the tetrapolymer is completed.

In the present invention, the final polymerization conversion rate of the polymer/monomer mixture, which is transferred into the devolatilizers, preferably the first devolatilizer, can be maintained in the range of 20 80 wt %. If the final polymerization conversion rate is less than 20 wt %, it will be difficult to transfer the polymer/monomer mixture through a polymer pump, because the mixture will have an excessively low melt viscosity, and if the final polymerization conversion rate is more than 80 wt %, it will also be difficult to transfer the polymer/monomer mixture through a polymer pump, because the mixture will have an excessively high melt viscosity. In an embodiment of the present invention, the temperature of the polymer, passed through the devolatilizer, can be controlled in the range of 60-300° C.

In the present invention, the extruder is equipped with a vacuum system, which is maintained at a vacuum of 0 to −760 mmHg, such that the unreacted monomers can be additionally removed. Also, the cylinder temperature thereof is set at a temperature of 100-350° C.

In the present invention, the tetrapolymer, prepared by bulk polymerization, comprises 5-60 wt % of the N-substituted maleimide monomer, 10-70 wt % of the α-alkylstyrene monomer, 5-50 wt % of the unsaturated nitrile monomer and 3-50 wt % of the aromatic vinyl monomer and has a weight-average molecular weight (Mw) of 70,000-300,000, a glass transition temperature of 150-200° C., and low melt viscosity.

In the present invention, the monomer mixture may additionally contain less than 20 wt % of an organic solvent and contains 0-5000 ppm of an initiator. In the present invention, the solvent can be selected from the group consisting of organic solvents, having a boiling point of 60-200° C., and mixtures thereof, and the initiator can be selected from the group consisting of azobisisobutyronitrile, benzoyl peroxide, t-butylperoxy-2-ethyl-hexanoate, cumyl peroxide, t-butyl peroxide, 1,1-di-(t-butylperoxy)cyclohexane, and mixtures thereof.

In the present invention, the monomer mixture may contain a molecular weight-adjusting agent in order to adjust the molecular weight thereof. The molecular weight-adjusting agent can be selected from the group consisting of n-dodecylmercaptane, n-amylmercaptane, t-butylmercaptane, t-dodecylmercaptane, n-hexylmercaptane, n-octylmercaptane, n-nonylmercaptane, and mixtures thereof. Also, it is preferably used in an amount of 0-5000 ppm based on 100 parts by weight of the monomer mixture.

Advantageous Effects

The present invention provides a heat-resistant bulk tetrapolymer, which has excellent heat resistance and is prepared by bulk polymerization. Also, the present invention provides a bulk polymerization process which can effectively produce the heat-resistant tetrapolymer. The heat-resistant tetrapolymer, which is prepared according to the present invention, is easily melt-blended with other engineering plastics due to its low melt viscosity, and thus will greatly contribute to an improvement in the physical properties of the resulting product.

Also, the heat-resistant tetrapolymer, which is prepared according to the present invention, has advantages in that it has excellent stability due to its low impurity content, and the production cost thereof is low, because it is prepared through the bulk polymerization process.

BRIEF DESCRIPTION OF THE DRAWINGS

FIG. 1 shows the shear rates and shear viscosities of the products of Examples 1-8 of the present invention and prior products.

FIG. 2 shows the shear rates and shear viscosities of the products of Examples 1-8 of the present invention and prior products.

FIG. 3 shows a process diagram according to one embodiment of the present invention.

BEST MODE FOR CARRYING OUT THE INVENTION

Hereinafter, the present invention will be described in further detail with reference to the following examples, but the scope of the present invention is not limited to these examples.

EXAMPLES

Examples 1 to 8

As shown in FIG. 3, N-phenylmaleimide, α-methylstyrene, acrylonitrile and styrene, as main raw materials, were first introduced into a first preparation tank 1 at room temperature in the amounts shown in Table 1 below and were mixed with stirring. After completion of the mixing, the monomer mixture in the first preparation tank 1 was slowly introduced into the upper portion of a polymerization reactor, while the temperature of the polymerization reactor was elevated to a suitable temperature. Also, in this process, a solvent and an initiator were slowly introduced into the upper portion of the polymerization reactor in the amounts shown in Table 1. During the polymerization process, the same monomer mixtures as described above were also prepared in second, third, fourth and fifth preparation tanks 2, 3, 4 and 5 in the same manner as described above and were sequentially introduced into the polymerization reactor.

As the rates of polymerization in stirred tank reactors 11, 12, 13, 14, 15, connected in series with each other, reached the conversion rates shown in Table 2, the resulting polymer/monomer mixtures were transferred from the lower ends of the stirred tank reactors through a polymer pump into a first devolatilizer 31. During the transfer, the mixtures were passed through a first heat exchanger 21, so that it was heated to the operating temperature of the first devolatilizer 31. The first devolatilizer 31 was operated in a vacuum of 350 torr at 150° C., thus recovering the unreacted monomers. After the mixtures were passed through the first devolatilizer 31, they were passed through a second heat exchanger 22, in which they were heated to the operating temperature of a second devolatilizer 32. Then, the mixtures were passed through the second devolatilizer 32, which was operated in a vacuum of 750 torr at 250° C., thus recovering the remaining unreacted monomers.

A series of continuous processes as described above were repeated until the production of the tetrapolymer was completed. Also, during passage through the first and second devolatilizers, the remaining unreacted monomers were volatilized and recovered through a condenser 51. The composition ratios of the recovered monomers were calculated using GC (gas chromatography) equipment, and the monomers were introduced again into the polymerization reactor through the upper portion of the polymerization reactor. A series of such devolatilization processes were also repeated until the production of the tetrapolymer was completed.

The molten polymer, which has been passed through the first and second devolatilization units 31 and 32 and from which the remaining unreacted monomers have been substantially removed, was passed through an extruder 41, the cylinder temperature of which was set at 180-260° C. and which was equipped with a vacuum system. Then, a pellet-shaped, maleimide-α-alkylstyrene-based, heat-resistant tetrapolymer was finally prepared. The composition of the tetrapolymer thus prepared was analyzed using EA (elementary analysis, Vario EL/ELEMENTAR), 1H/13C NMR (nuclear magnetic resonance, 400 MHz/VARIAN) and FT-IR (Fourier transform infrared spectroscopy, FTS-60A/VIO-RAD). Also, the molecular weight thereof was analyzed by determining a value relative to a standard polystyrene (PS) sample through GPC (gel permeation chromatography, Shimadzu VP) using THF (tetrahydrofuran) as an eluate. Moreover, the glass transition temperature thereof was analyzed using DSC (differential scanning calorimetry, Diamond/Perkin-Elmer), the remaining unreacted monomers were analyzed using GC (gas chromatography, CP-3800/VARIAN), and the high-temperature thermal stability thereof was analyzed by measuring a temperature value corresponding to a loss of 1 wt % compared to initial weight, using TGA (thermogravimetric analysis, Pyris6/Perkin-Elmer). In addition, the melt viscosity thereof was measured using Reometer (Rosand Capillary/15 mm; shear rate method) under a gradually increasing load. The analysis results are shown in Tables 1 and 2 below and FIG. 1.

TABLE 1

| | | | 1 | 2 | 3 | 4 | 5 | 6 | 7 | 8 |
|---|---|---|---|---|---|---|---|---|---|---|
| Compositions introduced into polymerization reactor | Preparation tank | N-phenylmaleimide monomer (wt %) | 28.5 | 18.6 | 36.0 | 40 | 42.7 | 42.7 | 29.7 | 22.5 |
| | | α-methylstyrene monomer (wt %) | 28.5 | 46.5 | 18.0 | 20 | 9.5 | 9.5 | 27.9 | 36.0 |
| | | Acrylonitrile monomer (wt %) | 23.8 | 18.6 | 27.0 | 30 | 38.0 | 38.0 | 30.7 | 22.5 |
| | | Styrene monomer (wt %) | 14.2 | 9.3 | 9.0 | 10 | 4.8 | 4.8 | 4.7 | 9.0 |
| | Feed line 1 | Solvent (wt %) | 5.0 | 7.0 | 10.0 | — | 5.0 | 5.0 | 7.0 | — |
| | Feed line 2 | Initiator (ppm) | — | 2000 | — | 500 | 500 | — | 1000 | 1500 |
| Polymerization conditions | Operating conditions | Polymerization temperature (° C.) | 110 | 120 | 110 | 90 | 90 | 95 | 120 | 120 |
| | | Polymerization time (hr) | 4.0 | 4.0 | 4.0 | 4.0 | 4.0 | 4.0 | 4.0 | 4.0 |
| | | Devolatilization time (hr) | 1.0 | 1.0 | 1.0 | 1.0 | 1.0 | 1.0 | 1.0 | 1.0 |
| | | First heat exchanger (° C.) | 150 | 150 | 150 | 150 | 150 | 150 | 150 | 150 |
| | | First devolatilizer (mmHg) | −350 | −350 | −350 | −350 | −350 | −350 | −350 | −350 |
| | | Second heat exchanger (° C.) | 250 | 250 | 250 | 250 | 250 | 250 | 250 | 250 |
| | | Second devolatilizer (mmHg) | −750 | −750 | −750 | −750 | −750 | −750 | −750 | −750 |
| | Additives | Solvent | Tol. | Tol. | Tol. | — | Tol. | Tol. | Tol. | — |
| | | Initiator | — | a) | — | b) | b) | — | a) | a) |

Note:
Tol. indicates toluene, a) indicates 1,1-di-(t-butylperoxy)cyclohexane, and b) indicates benzoyl peroxide.

TABLE 2

| | | 1 | 2 | 3 | 4 | 5 | 6 | 7 | 8 |
|---|---|---|---|---|---|---|---|---|---|
| Polymerization conversion (%) | | 55 | 55 | 60 | 60 | 60 | 60 | 55 | 55 |
| Composition (wt %) of monomers in tetrapolymer | N-phenylmaleimide monomer (PMI, wt %) | 33 | 23 | 43 | 43 | 45 | 45 | 30 | 25 |
| | α-methylstyrene monomer (AMS, wt %) | 27 | 47 | 20 | 20 | 10 | 10 | 30 | 33 |
| | Acrylonitrile monomer (AN, wt %) | 25 | 20 | 30 | 30 | 40 | 40 | 35 | 22 |
| | Styrene monomer (SM, wt %) | 15 | 10 | 7 | 7 | 5 | 5 | 5 | 20 |

TABLE 2-continued

| | | 1 | 2 | 3 | 4 | 5 | 6 | 7 | 8 |
|---|---|---|---|---|---|---|---|---|---|
| Instrumental analysis results | Weight-average molecular weight (Mw, ×10$^4$) | 15 | 10 | 21 | 25 | 20 | 23 | 15 | 18 |
| | Glass transition temperature (° C.) | 175 | 155 | 182 | 191 | 200 | 197 | 167 | 160 |
| | Thermal stability (° C., 1 wt % loss/TGA) | 345 | 330 | 350 | 352 | 360 | 356 | 342 | 340 |
| | Contents (ppm) of remaining unreacted monomers  PMI | 60 | 58 | 56 | 55 | 57 | 51 | 53 | 50 |
| | AMS | 50 | 55 | 52 | 45 | 53 | 52 | 45 | 50 |
| | AN | 20 | 25 | 20 | 22 | 19 | 23 | 20 | 21 |
| | SM | 20 | 25 | 30 | 22 | 20 | 25 | 23 | 22 |
| Color tone | | Light yellow | Light yellow | Light yellow | Light yellow | Light yellow | Light yellow | Light yellow | Light yellow |
| Peak shape in DSC measurement after blending with other resins | | One peak | One peak | One peak | One peak | One peak | One peak | One peak | One peak |

Note:
one peak means very excellent blendability with other resins

Comparative Examples 1 to 8

In Comparative Examples, α-methylenestyrene and acrylonitrile were first introduced into a batch reactor. Alternatively, α-methylenestyrene and acrylonitrile were introduced, and then maleic anhydride was introduced with stirring. Alternatively, α-methylenestyrene, acrylonitrile and styrene were introduced, and then maleic anhydride was introduced with stirring. Also, a solvent and an initiator for each of the monomer mixtures were introduced, and the temperature of the reactor was elevated to a suitable temperature. As a suitable degree of polymerization was reached, the polymer/monomer mixture was transferred from the lower portion of the reactor into a DMF (N,N-dimethylformamide) solvent tank, in which it was completely dissolved. The resulting polymer solution was passed through a resolidification process in which the polymer solution was slowly added to the upper portion of a solvent tank containing a large amount of methanol, while only the polymer was resolidified, a filtering process in which only the polymer was filtered, and an extruder equipped with a vacuum system, thus preparing a pellet-shaped heat-resistant reinforcing material. The composition of the heat-resistant reinforcing material thus prepared was analyzed using EA (elementary analysis, Vario EL/ELEMENTAR), 1H NMR (nuclear magnetic resonance, 400 MHz/VARIAN) and FT-IR (Fourier transform infrared spectroscopy, FTS-60A/VIO-RAD), and the molecular weight thereof was analyzed by determining a value relative to a standard polystyrene (PS) sample through GPC (gel permeation chromatography, Shimadzu VP) using THF (tetrahydrofuran) as an eluate. Also, the glass transition temperature thereof was analyzed using DSC (differential scanning calorimetry, Diamond/Perkin-Elmer), and the remaining unreacted monomers were analyzed using GC (gas chromatography, CP-3800/VARIAN). In addition, the high-temperature thermal stability thereof was analyzed by measuring a temperature value corresponding to a loss of 1 wt % compared to initial weight, using TGA (thermogravimetric analysis, Pyris6/Perkin-Elmer). The analysis results are shown in Tables 3 and 4 below.

TABLE 3

| | | | 1 | 2 | 3 | 4 | 5 | 6 | 7 | 8 |
|---|---|---|---|---|---|---|---|---|---|---|
| Compositions introduced into polymerization reactor | Polymerization reactor | Maleic anhydride monomer (wt %) | — | — | 18.0 | 36.0 | 13.5 | 27.0 | 22.5 | 31.5 |
| | | α-methylstyrene monomer (wt %) | 58.5 | 58.5 | 31.5 | 9.0 | 36.0 | 18.0 | 27.0 | 22.5 |
| | | Acrylonitrile monomer (wt %) | 41.5 | 27.0 | 27.0 | 45.0 | 22.5 | 27.0 | 13.5 | 13.5 |
| | | Styrene monomer (wt %) | — | 4.5 | 13.5 | — | 18.0 | 18.0 | 27.0 | 22.5 |
| | Feed line 1 | Solvent (wt %) | 10.0 | 10.0 | 10.0 | 10.0 | 10.0 | 10.0 | 10.0 | 10.0 |
| | Feed line 2 | Initiator (ppm) | 3000 | 3000 | 2000 | — | 2000 | 2000 | 2000 | — |
| Polymerization conditions | Operating conditions | Polymerization temperature (° C.) | 130 | 130 | 120 | 120 | 120 | 120 | 125 | 120 |
| | | Polymerization time (hr) | 9 | 8 | 5 | 5 | 5 | 5 | 5 | 5 |
| | Additives | Solvent | EB | EB | EB | EB | EB | EB | EB | EB |
| | | Initiator | a) | a) | a) | — | a) | a) | a) | — |

Note:
EB indicates ethylbenzene, and a) indicates 1,1-di-(t-butyloxy)cyclohexane.

TABLE 4

|  |  | 1 | 2 | 3 | 4 | 5 | 6 | 7 | 8 |
|---|---|---|---|---|---|---|---|---|---|
| Polymerization conversion (%) | | 50 | 55 | 55 | 60 | 55 | 55 | 55 | 60 |
| Composition (wt %) of monomer units in heat-resistant reinforcing materials | Maleic anhydride monomer (PMI, wt %) | — | — | 20 | 35 | 15 | 30 | 23 | 35 |
| | α-methylstyrene monomer (AMS, wt %) | 60 | 60 | 30 | 10 | 38 | 17 | 25 | 25 |
| | Acrylonitrile monomer (AN, wt %) | 40 | 28 | 25 | 55 | 25 | 25 | 15 | 15 |
| | Styrene monomer (SM, wt %) | — | 12 | 25 | — | 22 | 28 | 37 | 25 |
| Instrumental analysis results | Weight-average molecular weight | 10 | 11 | 15 | 20 | 17 | 16 | 13 | 15 |
| | Glass transition temperature (° C.) | 115 | 117 | 150 | 170 | 145 | 148 | 151 | 160 |
| | Thermal stability (° C., 1 wt % loss/TGA) | 300 | 300 | 290 | 285 | 280 | 290 | 300 | 280 |
| | Contents (ppm) of remaining unreacted monomers MA | 55 | 50 | 65 | 61 | 53 | 55 | 65 | 60 |
| | AMS | 55 | 50 | 60 | 53 | 45 | 50 | 48 | 52 |
| | AN | 25 | 22 | 23 | 24 | 25 | 30 | 28 | 25 |
| | SM | 30 | 28 | 25 | 23 | 21 | 25 | 24 | 33 |
| Color tone | | Light yellow | Light yellow | Light brown | Light brown | Light brown | Light brown | Light brown | Light brown |
| Peak shape in DSC measurement after blending with other resins | | Two peaks | Two peaks | Two peaks | Two peaks | Two peaks | Two peaks | Two peaks | Two peaks |

Note:
"two peaks" means poor blendability with other resins.

The invention claimed is:

1. A tetrapolymer comprising an N-substituted maleimide monomer, an α-alkylstyrene monomer, an unsaturated nitrile monomer and an aromatic vinyl monomer, wherein the tetrapolymer does not contain emulsifier and coagulant.

2. The tetrapolymer of claim 1, wherein the bulk tetrapolymer comprises 5-60 wt % of the N-substituted maleimide monomer, 10-70 wt % of the α-alkylstyrene monomer, 5-50 wt % of the unsaturated nitrile monomer and 3-50 wt % of the aromatic vinyl monomer.

3. The tetrapolymer of claim 1, wherein the N-substituted maleimide monomer is selected from the group consisting of phenylmaleimide, maleimide, N-methylmaleimide, N-ethylmaleimide, N-propylmaleimide, N-isopropylmaleimide, N-butylmaleimide, N-isobutylmaleimide, N-t-butylmaleimide, N-cyclohexylmaleimide, N-chlorophenylmaleimide, N-methylphenylmaleimide, N-bromophenylmaleimide, N-naphthylmaleimide, N-laurylmaleimide, N-hydroxyphenylmaleimide, N-methoxyphenylmaleimide, N-carboxyphenylmaleimide, N-nitrophenylmaleimide, N-benzylmaleimide, mixtures thereof, and mixtures of these monomers with a small amount of monomers copolymerizable therewith.

4. The tetrapolymer of claim 1, wherein the α-alkylstyrene monomer is selected from the group consisting of α-methylstyrene, α-ethylstyrene, methyl α-methyl, and mixtures of these monomers with a small amount of monomers copolymerizable therewith.

5. The tetrapolymer of claim 1, wherein the unsaturated nitrile monomer is selected from the group consisting of acrylonitrile, methacrylonitrile, ethacrylonitrile, phenylacrylonitrile, a-chloroacrylonitrile, mixtures thereof, and mixtures of these monomers with a small amount of monomers copolymerizable therewith.

6. The tetrapolymer of claim 1, wherein the aromatic vinyl monomer is selected from the group consisting of styrenic monomers, including styrene, α-methylstyrene, vinyltoluene, t-butylstyrene, halogen-substituted styrene, 1,3-dimethylstyrene, 2,4-dimethylstyrene, ethylstyrene, mixtures thereof, and mixtures of these monomers with a small amount of monomers copolymerizable therewith.

7. The tetrapolymer of claim 1, wherein the tetrapolymer has a weight average molecular weight (Mw) of 70,000-300,000.

8. The tetrapolymer of claim 1, wherein the tetrapolymer has a glass transition temperature of 150-200° C.

9. The tetrapolymer of claim 1, wherein the tetrapolymer has a melt viscosity of 10-200 Pa.s.

* * * * *

UNITED STATES PATENT AND TRADEMARK OFFICE
Certificate

Patent No. 8,124,703 B2                                                Patented: February 28, 2012

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Dong Cheol Sohn, Ulsan (KR); and Sup Joo Lee, Ulsan (KR).

Signed and Sealed this Seventh Day of May 2013.

<div align="right">
DAVID W. WU<br>
<i>Supervisory Patent Examiner</i><br>
Art Unit 1762<br>
Technology Center 1700
</div>